Patented Feb. 3, 1931

1,791,429

UNITED STATES PATENT OFFICE

RURIC C. ROARK AND RICHARD T. COTTON, OF WASHINGTON, DISTRICT OF COLUMBIA, ASSIGNOR TO THE GOVERNMENT AND THE PEOPLE OF THE UNITED STATES OF AMERICA

INSECTICIDE AND FUMIGANT

No Drawing. Application filed February 23, 1929. Serial No. 342,287.

(GRANTED UNDER THE ACT OF MARCH 3, 1883, AS AMENDED APRIL 30, 1928; 370 O. G. 757)

This application is made under the act, approved April 30, 1928, and the invention herein described may be manufactured and used by or for the Government for governmental purposes without payment to us of any royalty thereon.

This invention relates to improvements in materials for destroying or checking the growth or multiplication of living organisms, whether plant or animal, which are economically injurious to man.

An object of the invention is to provide a material suitable for use as a fumigant.

Another object of the invention is to provide a material for fumigating wheat and other grains which will not injuriously affect the milling properties of the grain, the baking qualities of the flour made therefrom, or the value as feedstuffs of the grain or of the bran and other by-products.

Still another object of the invention is to provide a material which is relatively non-toxic to man and which can be used in place of hydrocyanic acid gas or carbon bisulphide for destroying insects.

We have found that ethylene oxide is an effective insecticide; that it does not injure the milling and baking qualities of wheat; that it does not bleach or otherwise injure clothing and fabrics; that it does not corrode metals; and that it is relatively non-toxic to man. Ethylene oxide is thus suitable for fumigating insects in grain, clothing, carpets, upholstered furniture, raisins and other foodstuffs in buildings where it is undesirable to use a fumigant highly poisonous to man.

Ethylene oxide is made from ethylene chlorohydrin ($CH_2OHCH_2Cl$) and potassium hydroxide solution. At ordinary temperatures it is a colorless gas; at low temperatures it is a mobile colorless liquid, boiling at 10.5° C. The specific gravity of liquid ethylene oxide is 0.887 at 7°/4° C. The empirical formula is $C_2H_4O$, and the structural formula is

The molecular weight is 44.031. It is miscible with water in all proportions and is soluble in the usual organic solvents. On heating it unites with water to form ethylene glycol ($CH_2OHCH_2OH$). Ethylene oxide is very reactive and combines with all compounds having a labile hydrogen atom, such as water, alcohol, ammonia, and acids.

The concentrated vapors of ethylene oxide are inflammable, but concentrations lethal to insects can be used with safety.

Ethylene oxide is not highly toxic to man, but when inhaled for a long time it produces a cyanosis, which, however, is counteracted by the use of carbon dioxide gas.

A dosage of 1 pound per 1,000 cubic feet of space for 20 hours proved to be 100 per cent lethal to specimens of the clothes moth, *Tineola biselliella;* the carpet beetles, *Attagenus piceus* and *Anthrenus vorax;* the rice weevil, *Sitophilus oryza;* the Indian meal moth, *Plodia interpunctella;* the saw-toothed grain beetle, *Oryzaephilus surinamensis;* the red-legged ham beetle, *Necrobia rufipes;* and the flour beetle, *Tribolium confusum.*

For commercial fumigation work it is recommended that the fumigant be used at the rate of 2 pounds per 1,000 cubic feet of space.

Tests with the vapors of ethylene oxide, carbon disulphide and carbon tetrachloride for comparative purposes are described by us in the August, 1928, issue of Industrial and Engineering Chemistry, vol. 20, No. 8, pp. 805–807, inclusive.

While we have described the use of ethylene oxide against certain specific pests, its application as an insecticide is not restricted to these species. Ethylene oxide may be used to kill flies, mosquitoes, and other household insects; or as a fumigant to kill any insect in an enclosed space, such as insects on trees or other vegetation temporarily confined under a fumigating test; insects in clothing, carpets, furs, upholstered furniture, etc., in a fumigating vault; insects in drawers, closets, trunks, boxes, or rooms that can be tightly closed; insects in mills, warehouses, ships, etc., and other places where the vapors of the fumigant can be confined for a definite period of time.

Having thus described our invention we claim:

1. As an insecticide, ethylene oxide.
2. An insecticide containing as its essential active ingredient ethylene oxide.
3. As a fumigant, ethylene oxide.
4. A fumigant containing as its essential active ingredient ethylene oxide.
5. A material for use in combating economically harmful plant and animal organisms containing as its essential active ingredient ethylene oxide.

RURIC C. ROARK.
RICHARD T. COTTON.